(12) United States Patent
Krampotich et al.

(10) Patent No.: US 7,978,951 B2
(45) Date of Patent: Jul. 12, 2011

(54) BULKHEAD WITH ANGLED OPENINGS AND METHOD

(75) Inventors: Dennis Krampotich, Shakopee, MN (US); Anthony Szczodroski, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 258 days.

(21) Appl. No.: 12/381,162

(22) Filed: Mar. 6, 2009

(65) Prior Publication Data

US 2009/0274431 A1 Nov. 5, 2009

Related U.S. Application Data

(60) Provisional application No. 61/072,186, filed on Mar. 28, 2008.

(51) Int. Cl.
*G02B 6/00* (2006.01)
*B21D 31/00* (2006.01)
(52) U.S. Cl. .................. 385/135; 72/379.2; 385/137
(58) Field of Classification Search .................. None
See application file for complete search history.

(56) References Cited

U.S. PATENT DOCUMENTS

| | | | |
|---|---|---|---|
| 5,011,257 A | 4/1991 | Wettengel et al. | |
| 5,214,735 A | 5/1993 | Henneberger et al. | |
| 5,289,558 A | 2/1994 | Teichler et al. | |
| 5,363,465 A | 11/1994 | Korkowski et al. | |
| 6,208,796 B1 | 3/2001 | Vigliaturo | |
| RE37,489 E | 1/2002 | Anton et al. | |
| 6,435,727 B1 | 8/2002 | Fingler et al. | |
| 6,678,457 B2 * | 1/2004 | Kim et al. | 385/135 |
| 6,741,783 B2 * | 5/2004 | Shibutani et al. | 385/134 |
| 6,760,531 B1 | 7/2004 | Solheid et al. | |
| 6,920,274 B2 | 7/2005 | Rapp et al. | |
| 7,241,182 B2 | 7/2007 | Clark et al. | |
| 7,376,321 B2 | 5/2008 | Bolster et al. | |
| 7,496,269 B1 * | 2/2009 | Lee | 385/135 |
| 2002/0150372 A1 | 10/2002 | Schray | |
| 2003/0095772 A1 | 5/2003 | Solheid et al. | |
| 2005/0135769 A1 | 6/2005 | Makooi et al. | |
| 2005/0207719 A1 | 9/2005 | Nakano | |

FOREIGN PATENT DOCUMENTS

| | | |
|---|---|---|
| EP | 1 186 921 A2 | 3/2002 |
| EP | 1 298 470 A2 | 4/2003 |
| EP | 1 473 578 A2 | 11/2004 |
| WO | WO 00/28363 | 5/2000 |

OTHER PUBLICATIONS

Invitation to Pay Additional Fees with Partial International Search mailed Jul. 7, 2009.
U.S. Appl. No. 61/072,184, filed Mar. 28, 2008; Krampotich; 29 pages.
U.S. Appl. No. 61/126,672, filed May 5, 2008; Krampotich; 33 pages.
U.S. Appl. No. 12/381,160, filed Mar. 6, 2009; Krampotich et al.
Component drawings of Mini Fiber Module, including Chassis Top, Support, and Bottom Cover; dated Nov. 28, 2007; 3 pages.
Mini Fiber Module Assembly (assembly drawing of the components dated Nov. 28, 2007); Admitted prior art; 1 page.
Adapter Plate drawing; dated Dec. 21, 2007; 1 page.

* cited by examiner

*Primary Examiner* — Omar Rojas
(74) *Attorney, Agent, or Firm* — Merchant & Gould P.C.

(57) ABSTRACT

A bulkhead adapter plate that mounts to a face panel of a cable management panel, and a method of making the bulkhead adapter plate. The plate including angled adapter mounting openings formed by performing a minimum number of bending operations.

8 Claims, 15 Drawing Sheets

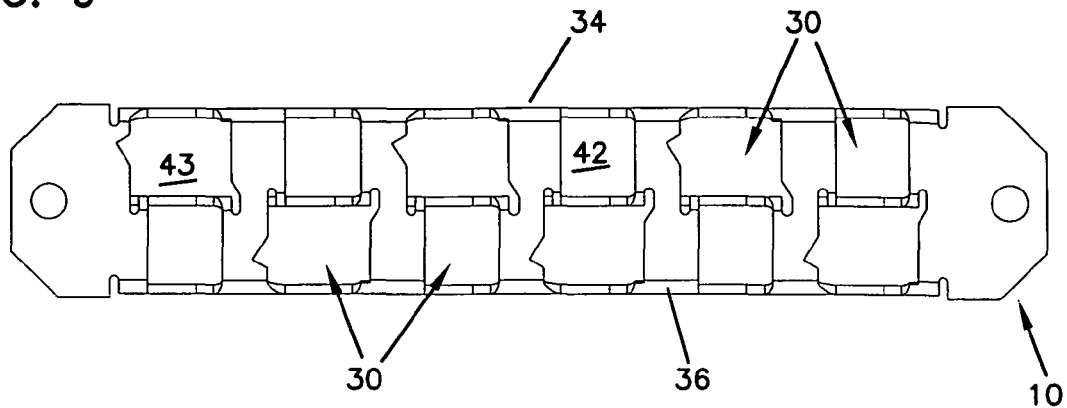
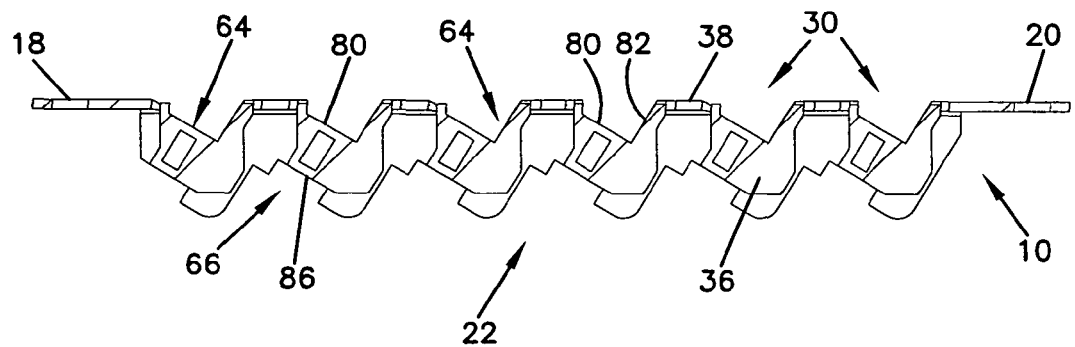
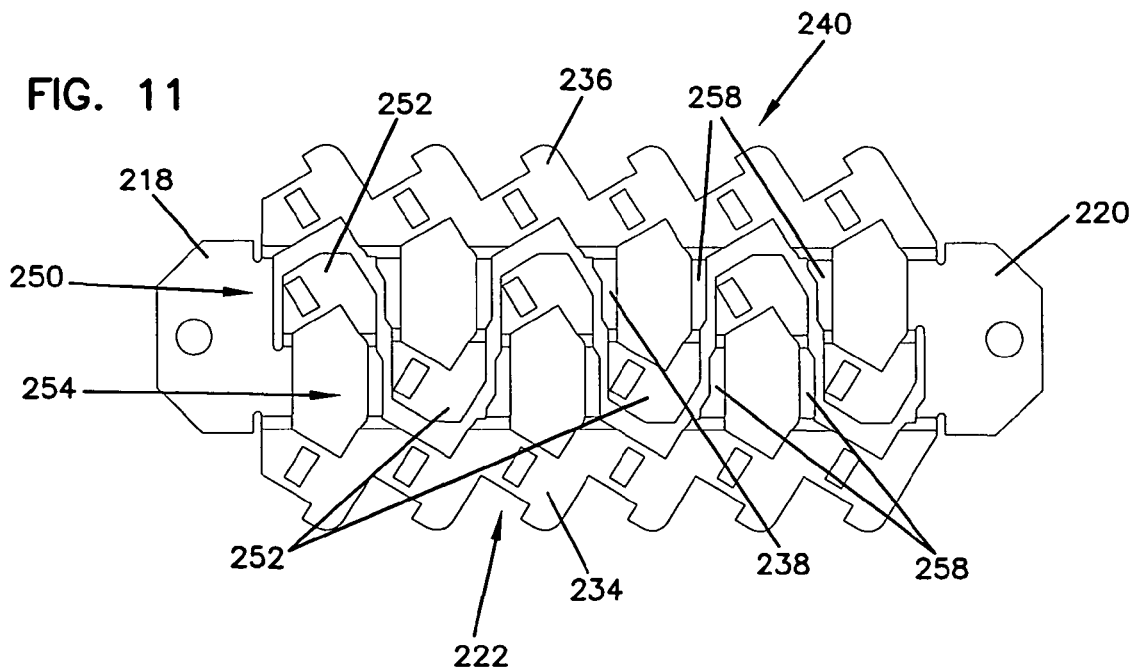

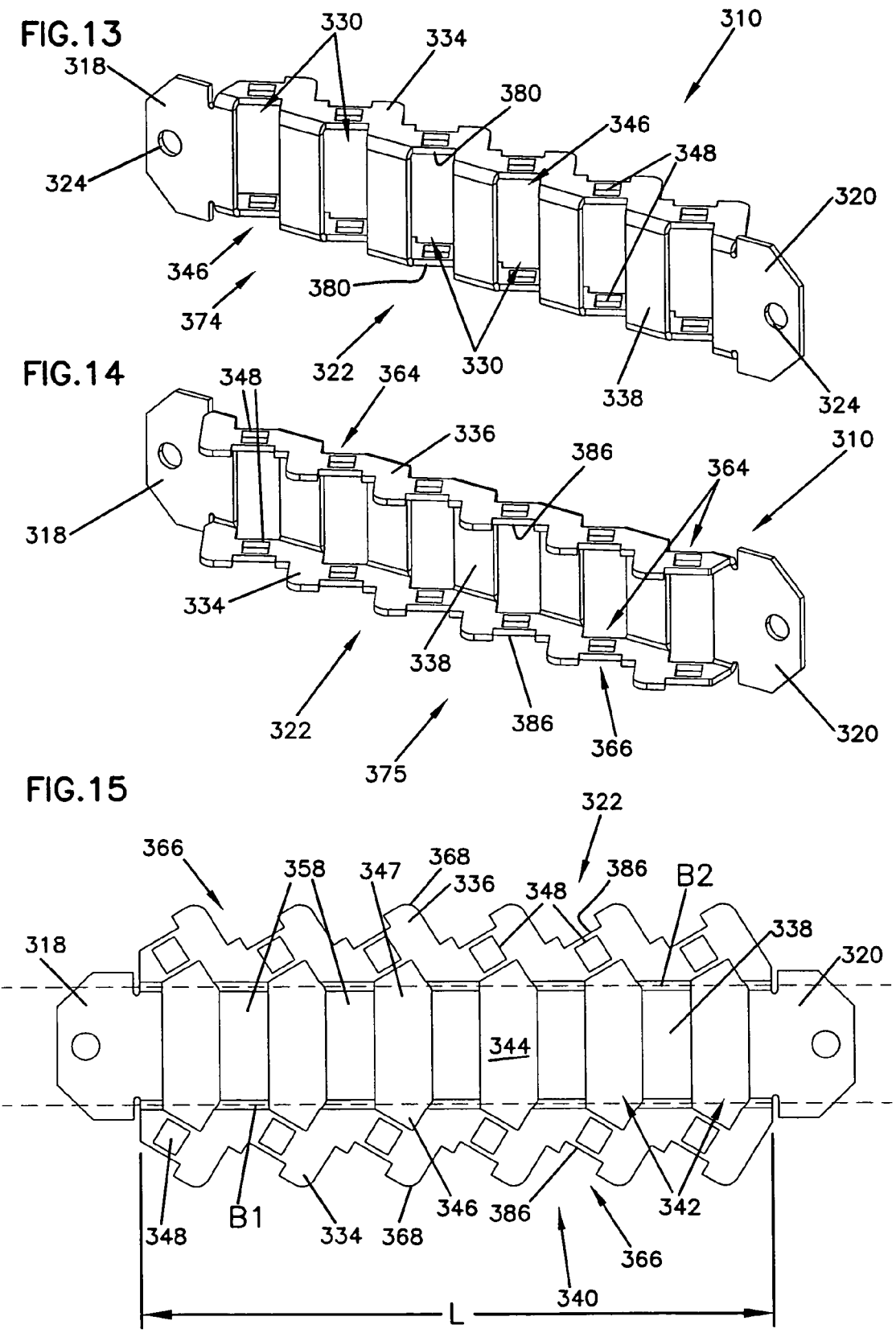

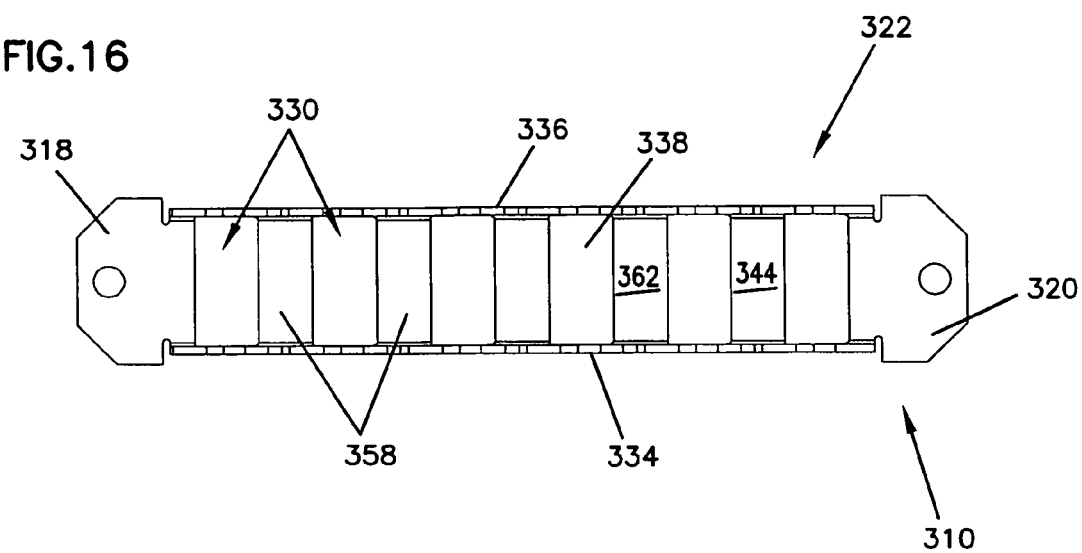
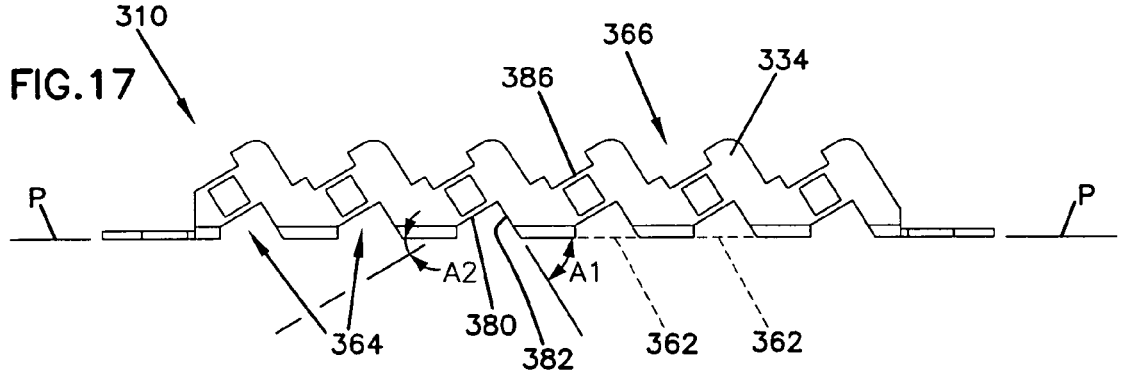
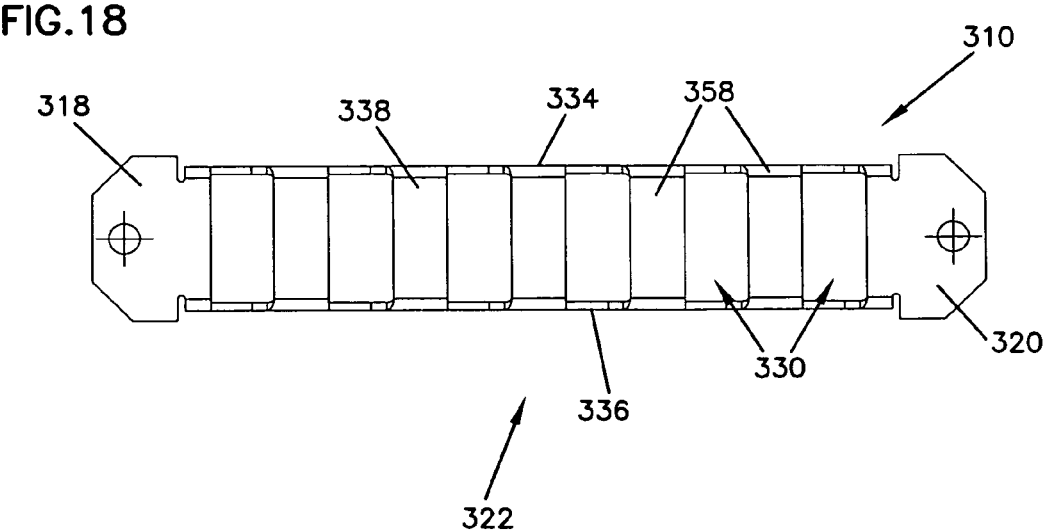

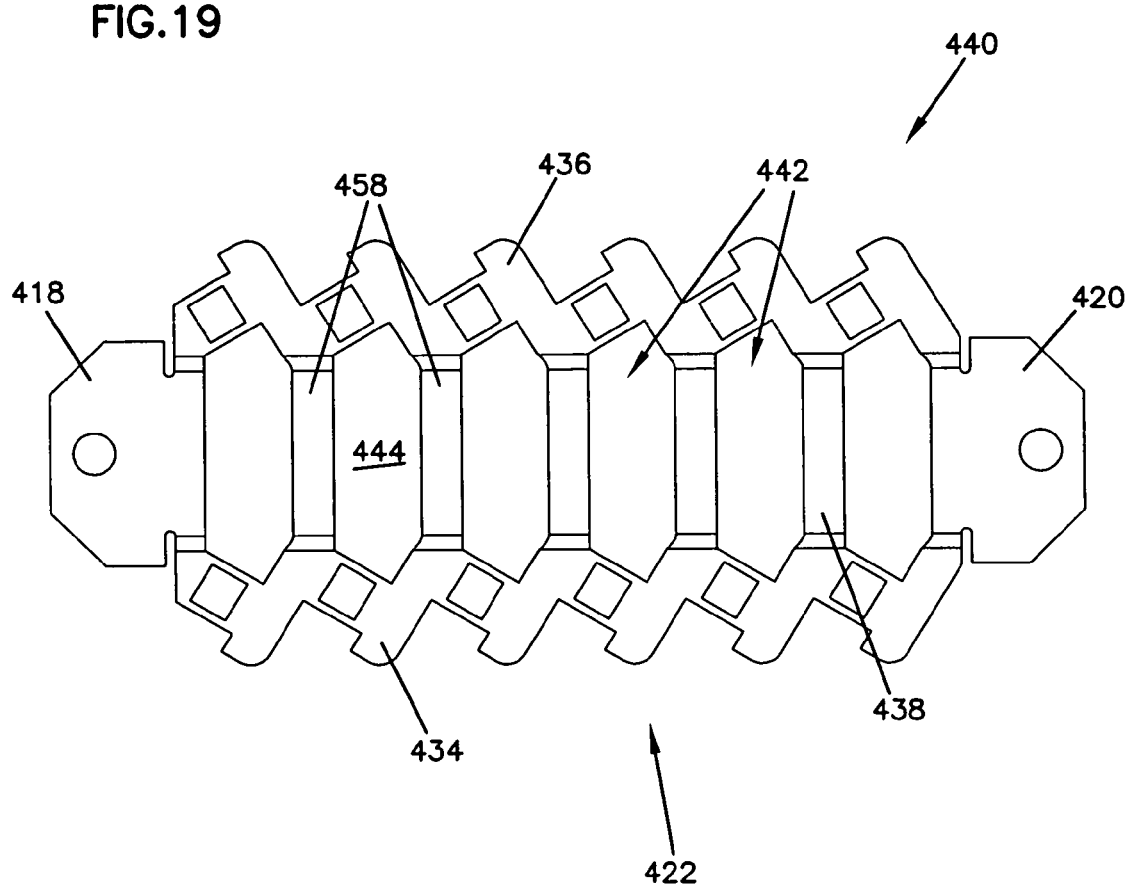

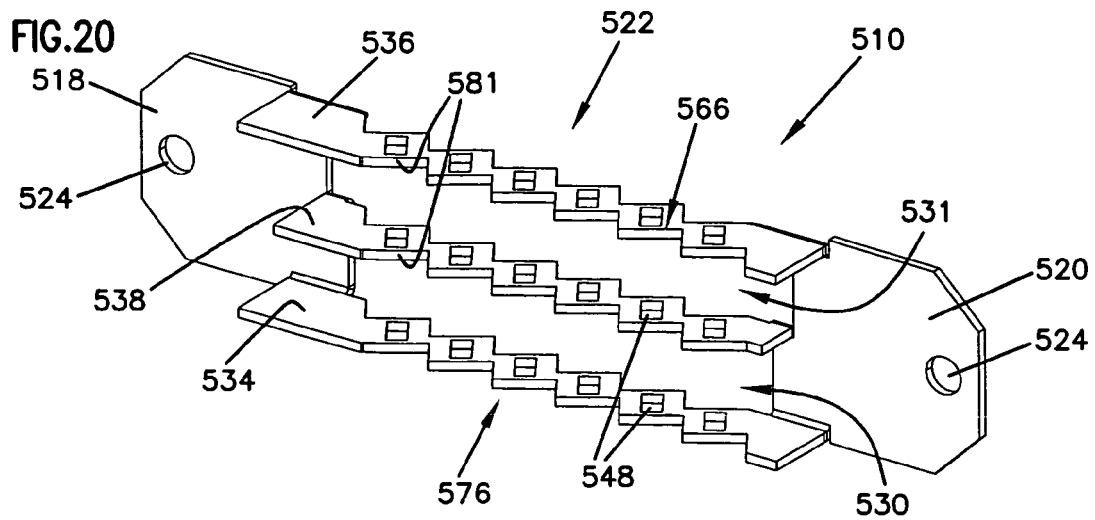
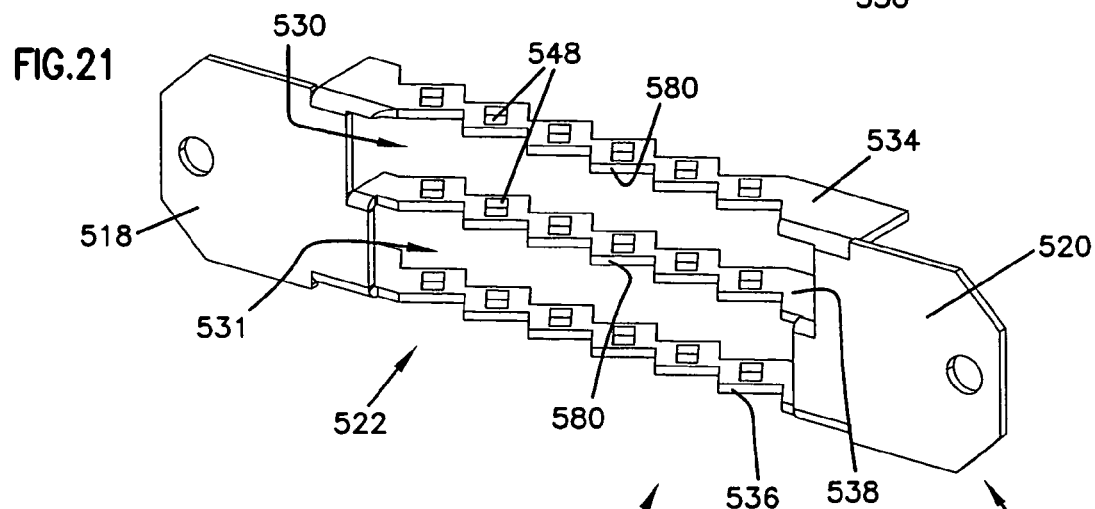
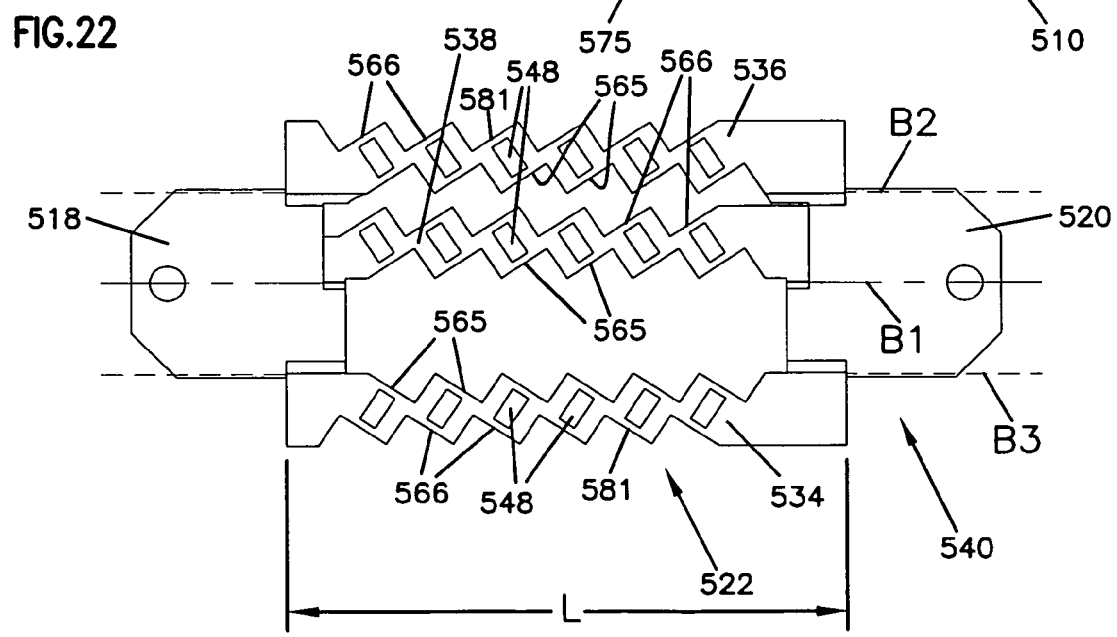

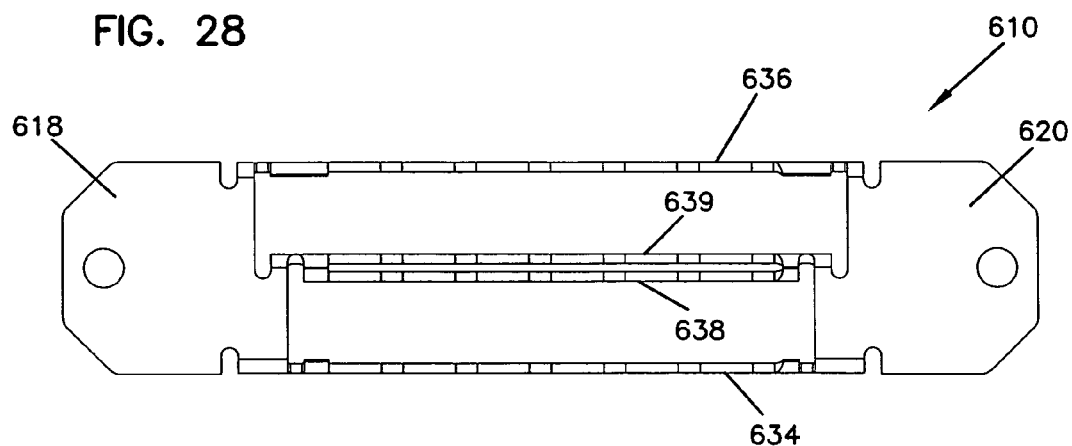
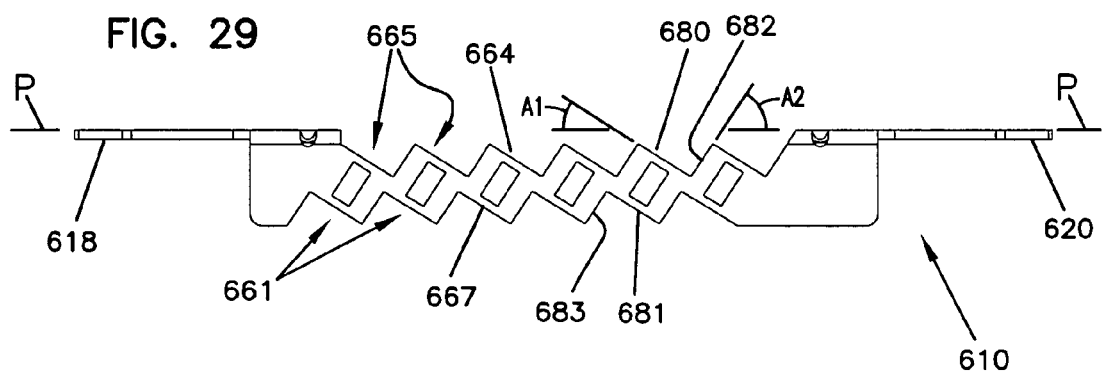

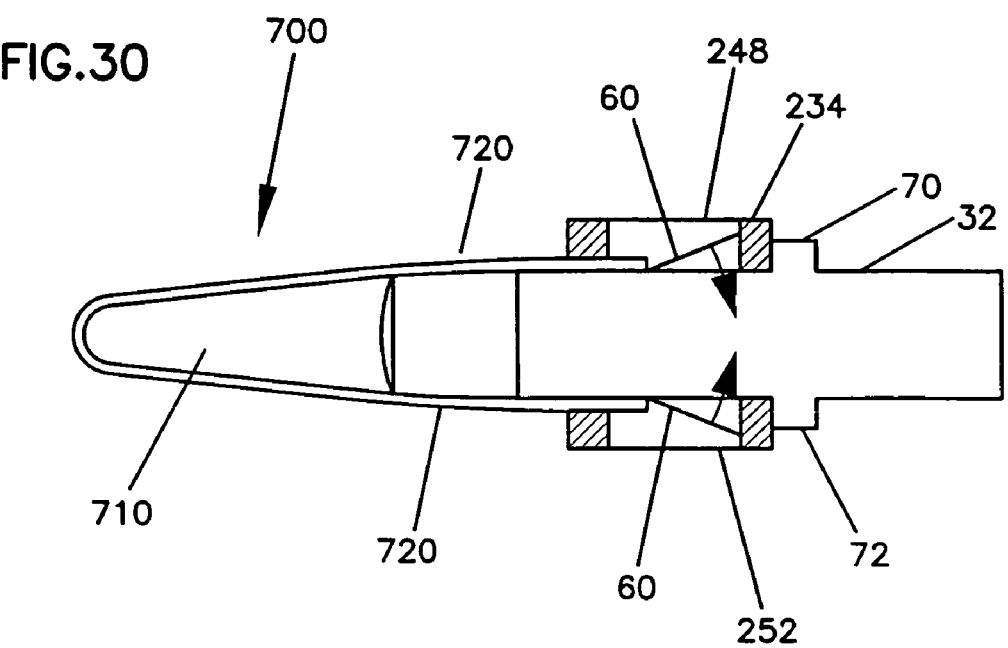

BULKHEAD WITH ANGLED OPENINGS AND METHOD

CROSS REFERENCE TO RELATED APPLICATIONS

This application claims the benefit of U.S. Provisional Application Ser. No. 61/072,186, filed Mar. 28, 2008; which application is incorporated herein by reference.

TECHNICAL FIELD

This disclosure relates generally to devices for management of telecommunication cables and associated methods. More particularly, this disclosure relates to adapter assemblies used in cable management panels for managing fiber optic cable terminations, and associated methods.

BACKGROUND

Cable management arrangements for cable termination, splice, and storage come in many forms. One cable management arrangement used in the telecommunications industry today includes sliding drawers installed on telecommunication equipment racks. The drawers provide organized, high-density, cable termination, splice, and storage in telecommunication infrastructures that often have limited space.

Because telecommunication infrastructures are massive in scale, fiber optic termination management can be difficult and costly to organize. There is a continued need in the art for better cable management devices and arrangements that address concerns regarding costs and organizational effectiveness of cable management arrangements.

SUMMARY

The present disclosure relates to a bulkhead adapter plate assembly that mounts to a face panel of a cable management panel, and a method of making the assembly. One aspect of the invention relates to an adapter plate having angled adapter mounting openings formed by performing a minimum number of bending operations. The method employing the minimum number of bend operations produces an adapter plate having improved flatness characteristics.

A variety of examples of desirable product features or methods are set forth in part in the description that follows, and in part will be apparent from the description, or may be learned by practicing various aspects of the disclosure. The aspects of the disclosure may relate to individual features as well as combinations of features, including combinations of features disclosed in separate embodiments. It is to be understood that both the foregoing general description and the following detailed description are explanatory only, and are not restrictive of the claimed invention.

BRIEF DESCRIPTION OF THE DRAWINGS

FIG. 9 is a top plan view of the bulkhead adapter plate of FIG. 3 formed upon completion of the bending process of the sheet form of FIG. 6;

FIG. 10 is another side elevation view of the bulkhead adapter plate of FIG. 3 formed upon completion of the bending process of the sheet form of FIG. 6;

FIG. 11 is a top plan view of another sheet form that forms a second embodiment of a bulkhead adapter plate, illustrated prior to a bending process;

FIG. 13 is a front perspective view of third embodiment of a bulkhead adapter plate according to the principles of the present disclosure;

FIG. 14 is a rear perspective view of the bulkhead adapter plate of FIG. 13;

FIG. 15 is a top plan view of a sheet form of the bulkhead adapter plate of FIG. 13, illustrated prior to a bending process;

FIG. 16 is a bottom view of the bulkhead adapter plate of FIG. 13 formed upon completion of the bending process of the sheet form of FIG. 15;

FIG. 17 is a side elevation view of the bulkhead adapter plate of FIG. 13 formed upon completion of the bending process of the sheet form of FIG. 15;

FIG. 18 is a top plan view of the bulkhead adapter plate of FIG. 13 formed upon completion of the bending process of the sheet form of FIG. 15;

FIG. 19 is a top plan view of another sheet form that forms a fourth embodiment of a bulkhead adapter plate similar to FIG. 13, illustrated prior to a bending process;

FIG. 20 is a rear perspective view of fifth embodiment of a bulkhead adapter plate according to the principles of the present disclosure;

FIG. 21 is a front perspective view of the bulkhead adapter plate of FIG. 20;

FIG. 22 is a top plan view of a sheet form of the bulkhead adapter plate of FIG. 20, illustrated prior to a bending process;

FIG. 28 is a bottom view of the bulkhead adapter plate of FIG. 25 formed upon completion of the bending process of the sheet form of FIG. 27;

FIG. 29 is a side elevation view of the bulkhead adapter plate of FIG. 25 formed upon completion of the bending process of the sheet form of FIG. 27; and FIG. 30 is a schematic representation of a tool that can be used to remove adapters from the mounting openings of one or more of the disclosed bulkhead adapter plate embodiments.

DETAILED DESCRIPTION

Figure 1:
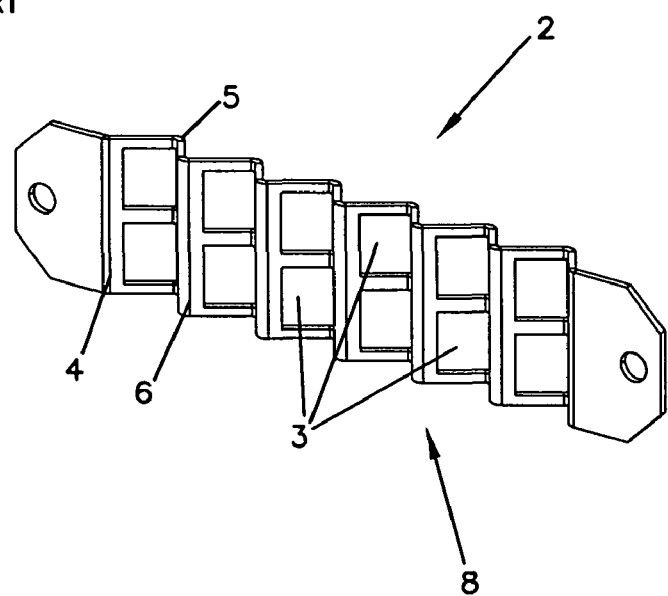
FIG. 1 is a front perspective view of a prior art adapter plate.
Figure 2:
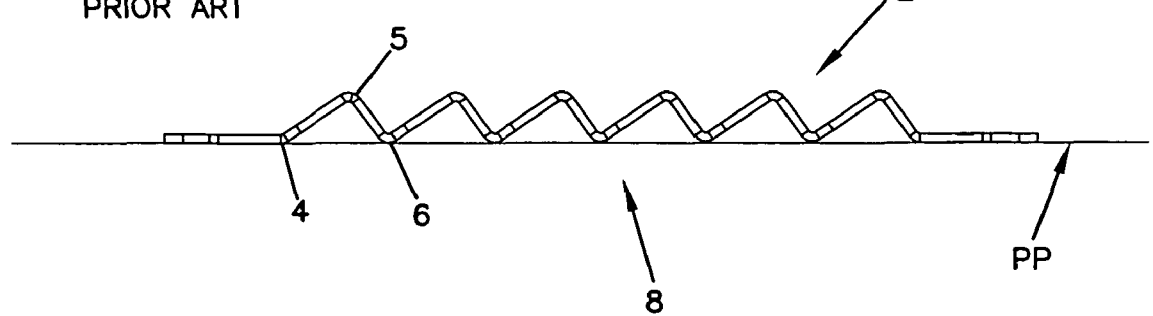
FIG. 2 is a side elevation view of the prior art adapter plate of FIG. 1.

FIGS. 1 and 2 illustrate a prior art adapter plate 2 used to mount adapters (not shown) to telecommunications equipment. The adapter plate defines a plurality of holes 3 sized to receive the adapters. To manufacture the adapter plate 2, a flat sheet of metal is put through a series of bending operations. In particular, a first bending operation is performed to create a first bend 4, a second bending operation is then performed to create a second bend 5, a third bending operation is then performed to create a third bend 6, and so on. To produce the plate 2 shown in FIGS. 1 and 2, thirteen bending operations are performed.

Each of the thirteen bending operations is performed sequentially. As can be understood, as the bending operations progress, the previously bent portions can become deformed and fall out of acceptable manufacturing tolerances. In particular, one problem often arising in the manufacture of such plates concerns the flatness of the front face 8 (defined by plane PP). The sequential bending operations cause the front face 8 to bow, twist, and otherwise fall outside an acceptable range of a specified dimensional flatness. Manufacturers commonly have to rework such plate components in an attempt to meet the required dimensional flatness.

Figure 3:
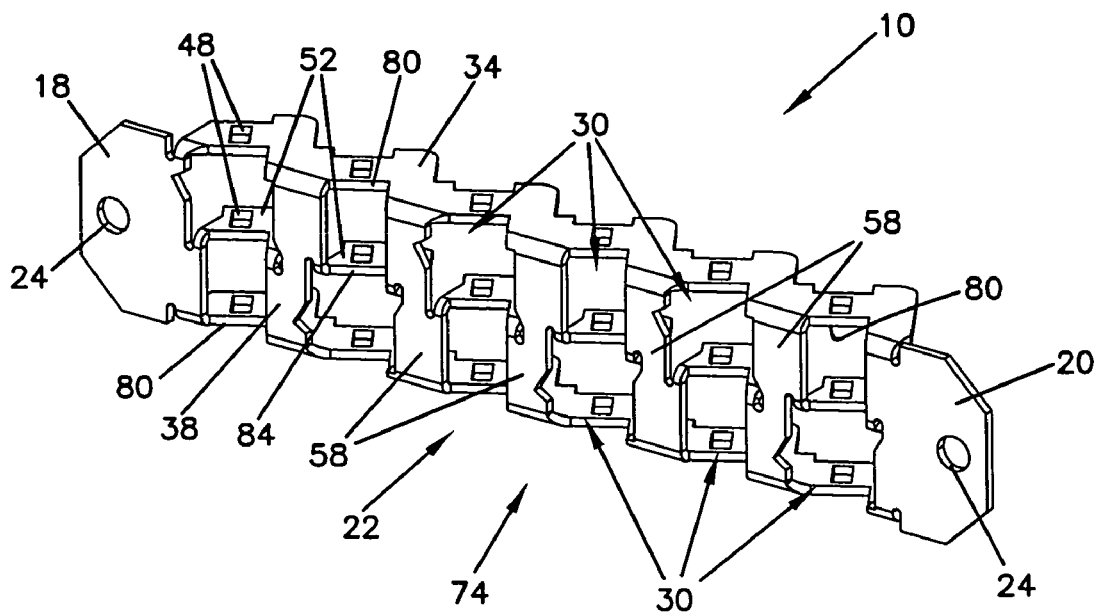
FIG. 3 is a front perspective view of a first embodiment of a bulkhead adapter plate according to the principles of the present disclosure.
Figure 4:
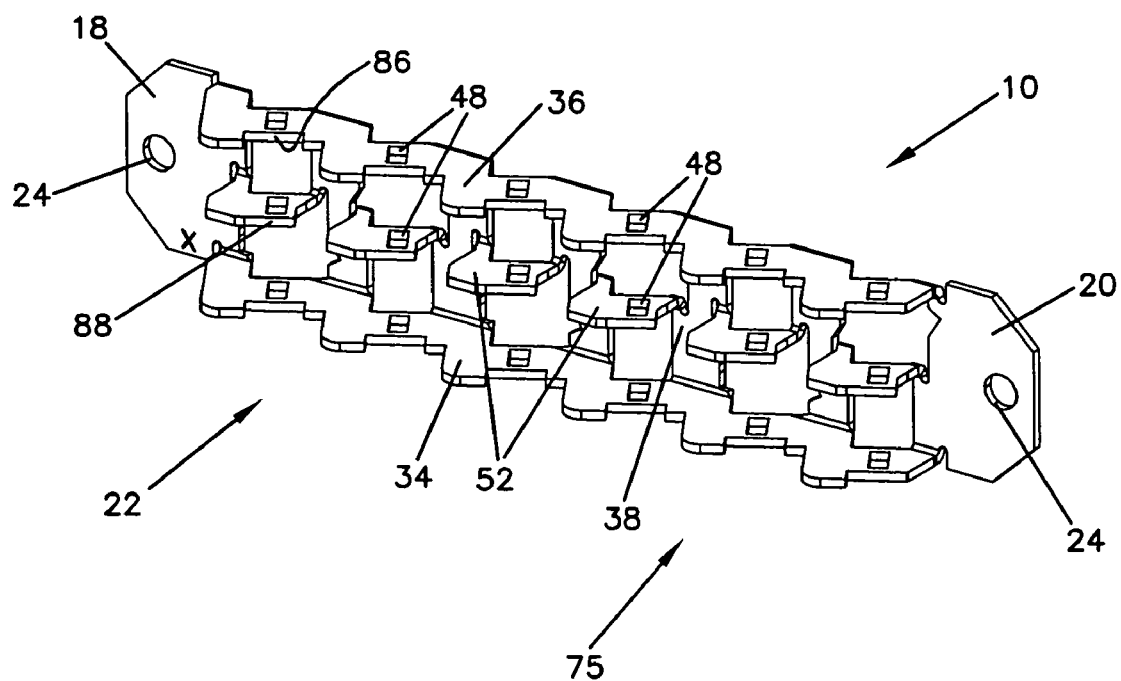
FIG. 4 is a rear perspective view of the bulkhead adapter plate of FIG. 3.
Figure 5:
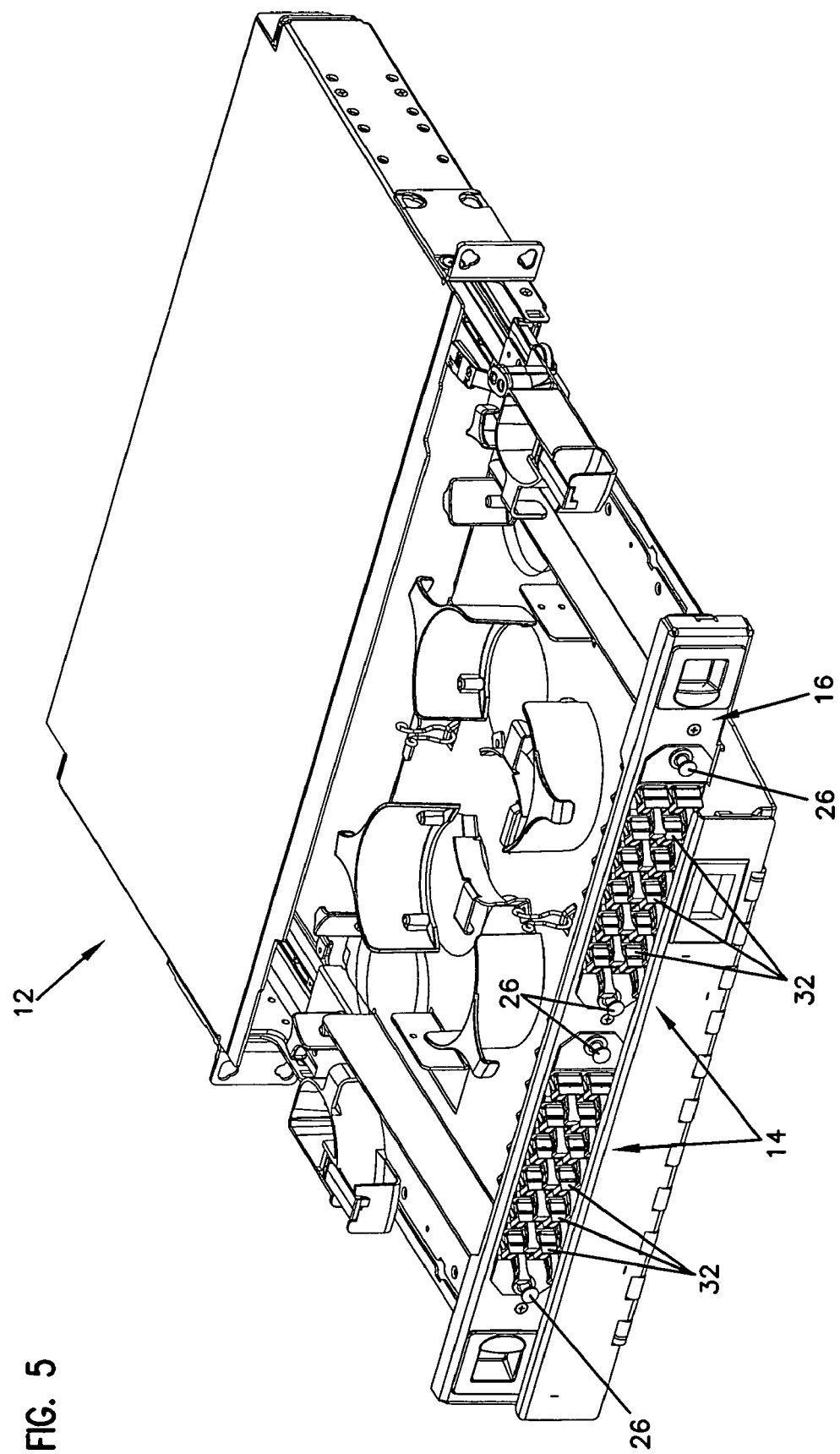
FIG. 5 is a front perspective view of one embodiment of a cable management panel including two bulkhead adapter plates in accordance with the principles disclosed.

Referring now to FIGS. 3 and 4, one embodiment a bulkhead adapter plate 10 according to the principles of the present disclosure is illustrated. The bulkhead adapter plate can be used in cable management drawers, such as the drawer 12 shown in FIG. 5. In FIG. 5, the drawer 12 includes two bulkhead adapter assemblies 14 that include a bulkhead adapter plate, such as the bulkhead adapter plate 10 shown in FIG. 3. The bulkhead adapter assemblies 14 mount within openings of a front panel 16 of the cable management drawer 12. Further details of an example cable management drawer or panel that can utilize the presently disclosed bulkhead adapter plates are described in U.S. Provisional Application No. 61/072,184, filed Mar. 28, 2008, U.S. Provisional Application No. 61/126,672, filed May 5, 2008, and U.S. Application No. 12,381,160, filed Mar. 6, 2009 which applications are incorporated herein by reference.

Referring back to FIGS. 3 and 4, the bulkhead adapter plate 10 generally includes a first flange end 18, a second flange end 20, and an adapter frame 22. The adapter frame 22 extends between the first and second flange ends 18 and 20. A mounting hole 24 is formed in each of the first and second flange ends 18, 20. The mounting holes 24 are sized to receive fasteners 26 (FIG. 5) that mount the bulkhead adapter plate 10 to the cable management drawer 12.

The bulkhead adapter plate 10 of the present disclosure defines a plurality of integral adapter mounting openings 30. The adapter mounting openings 30 are sized to receive adapters 32 (see e.g., FIG. 12), such as SC type adapter or LC type adapters; the openings can be sized to receive other types of adapters as well. The adapters and the adapter plate 10 define the bulkhead adapter assembly 14 (FIG. 5) that mounts in the front panel 16 of the cable management drawer 12.

Referring still to FIGS. 3 and 4, the adapter frame 22 of the bulkhead adapter plate 10 includes a first side portion 34, a second side portion 36, and a center portion 38 located between the first and second side portions. The center portion 38 of the adapter frame 22 is integrally connected to the first and second flange ends 18, 20 of the bulkhead adapter plate 10.

Figure 6:
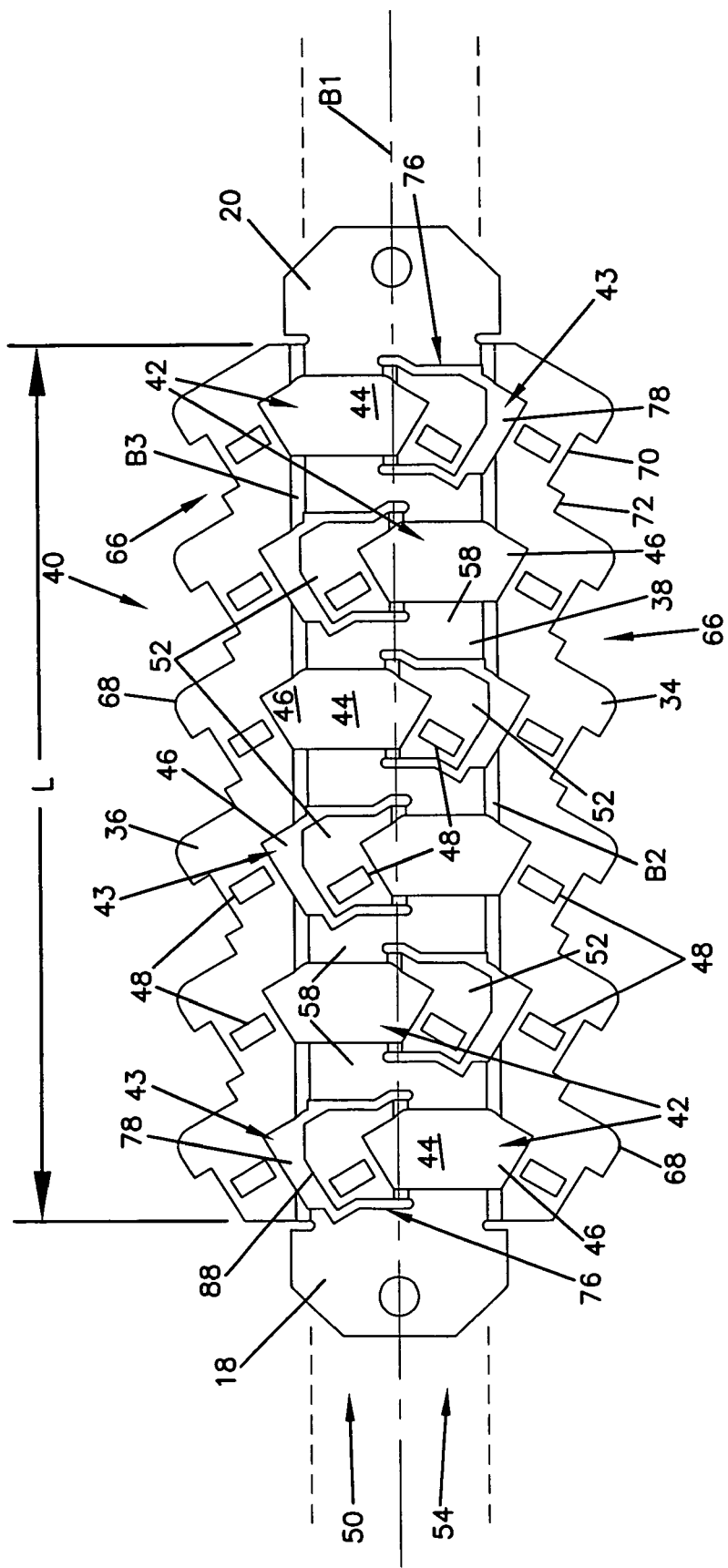
FIG. 6 is a top plan view of a sheet form of the bulkhead adapter plate of FIG. 3, illustrated prior to a bending process.

Referring now to FIG. 6, the bulkhead adapter plate 10 originates as a flat sheet of metal 40. The flat sheet of metal 40 includes each of the first and second flange ends 18, 20, the first and second side portions 34, 36 of the adapter frame 22, and the center portion 38 of the adapter frame 22.

The flat sheet of metal 40 further defines first and second apertures 42, 43. In the illustrated embodiment, six of the first apertures 42 and six of the second apertures 43 are provided. Each of the first apertures 42 has a first aperture portion 44 that extends into or is formed within the center portion 38 of the adapter frame 22, and a second aperture portion 46 that extends into or is formed within one of the side portions 34, 36 of the adapter frame. Similarly, each of the second apertures 43 has a first aperture portion 76 that extends into or is formed within the center portion 38 of the adapter frame 22, and a second aperture portion 78 that extends into or is formed within one of the side portions 34, 36 of the adapter frame.

The center portion 38 of the flat sheet of metal 40 also includes a first row 50 of center tabs 52 and a second row 54 of center tabs 52. The center tabs 52 are initially located within the first aperture portions 76 of the second apertures 43. The center tabs 52 further partly define the first aperture portions 44 of the first apertures 42. Each of the center tabs 52 of the first and second rows 50, 54 is interconnected to a cross piece 58 of the center portion 38. In this embodiment, each cross piece 58 extends between and is interconnected to each of the first and second side portions 34, 36 of the adapter frame 22. Through holes 48 are provided in each of the side portions 34, 36 and the center tabs 52 of the adapter frame 22.

Figure 8:
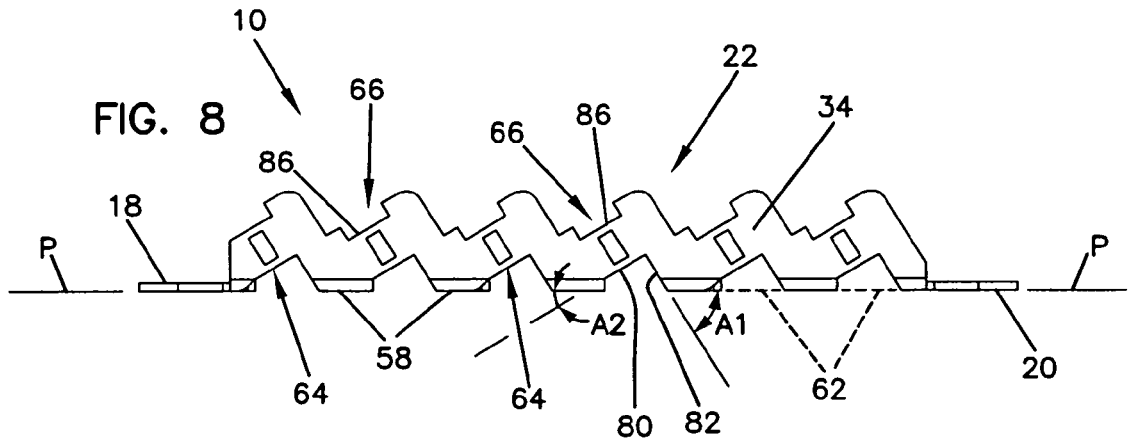
FIG. 8 is a side elevation view of the bulkhead adapter plate of FIG. 3 formed upon completion of the bending process of the sheet form of FIG. 6.

Referring now to FIGS. 3 and 8, the cross pieces 58 of the adapter frame 22 define a plane P (FIG. 8). The flatness of plane P is often specified as a manufacturing constraint because the flatness can affect the proper fit between the adapters 32 and the adapter mounting openings 30 of the adapter plate 10, and can also affect the proper fit between the adapter plate 10 and the opening in the front panel 16 of the cable management drawer 12. The present flat sheet of metal 40 and forming process produces a bulkhead adapter plate having a significantly improved flatness. The present flat sheet of metal 40 and the forming process further reduces the cost of manufacturing by reducing the number of bending operations; and likewise reduces costs by reducing rework associated with conventional manufacturing operations.

For example, to manufacture the present bulkhead adapter plate 10 of FIG. 3, the flat sheet of metal 40 (FIG. 6) undergoes four bending procedures. In particular, one row of the first and second rows 50, 54 of center tabs 52 (e.g., row 50) is first bent generally perpendicular to plane P (FIG. 8) at a bend line B1. The other of the first and second rows (e.g., 54) of tabs 52 is then similarly bent generally perpendicular to the plane P at the bend line B1. Next, one of the first and second side portions (e.g., 34) of the flat sheet of metal 40 is bent generally perpendicular to plane P at a bend line (e.g., B2); and last, the other of the first and second side portions (e.g., 36) is bent generally perpendicular to plane P at a bend line (e.g., B3).

Each of the bending operations includes bending the portions 34, 36 and the tabs 52 at bend lines B1-B3 that extend along a major dimension (i.e., the length L, FIG. 6) of the adapter frame 22. In contrast, the bending operations of the prior art method including bending the sheet of metal at bend lines (e.g., 4, 5 of FIG. 1) that extend along a transverse minor dimension (i.e., the width) of the adapter plate 2. Only four bending operations are required to produce the bulkhead adapter plate of FIGS. 3 and 4, as opposed to the thirteen bending operations required to produce the prior art plate 2 of FIG. 1. This reduces the costs of manufacturing by reducing the number of bending procedures required to produce the bulkhead adapter plate. Also, entire rows of openings are formed at the same time; this improves the flatness characteristics of the adapter plate as the plate is less likely to deform in comparison to prior art methods of manufacture involving many subsequent bending operations.

Referring to FIGS. 7-10, upon completion of the four bending operations, the first and second side portions 34, 36 are generally parallel to one another. The first and second rows of tabs 52 of the flat sheet of metal 40 (FIG. 6) now define a single row of tabs 52 that are generally parallel to the first and second side portions 34, 36.

Figure 7:
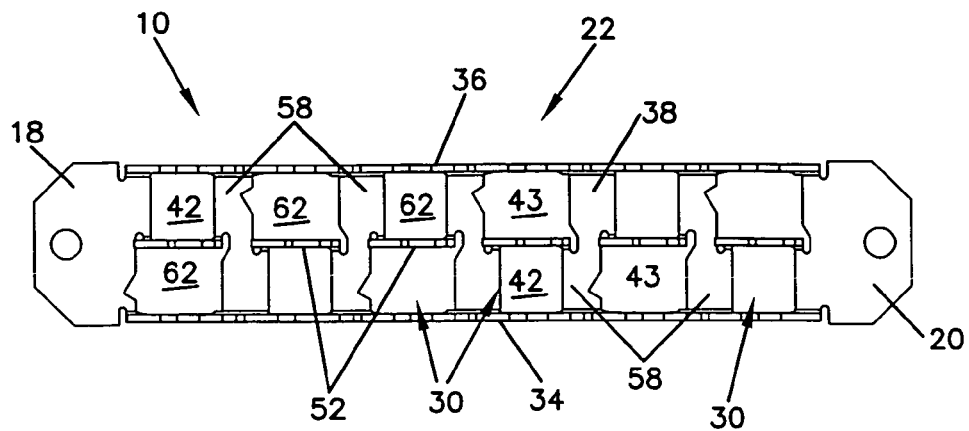
FIG. 7 is a bottom view of the bulkhead adapter plate of FIG. 3 formed upon completion of the bending process of the sheet form of FIG. 6.

Referring to FIGS. 7 and 9, the apertures 42, 43 of the flat sheet of metal 40 form the adapter mounting openings 30 of the bulkhead adapter plate 10. In particular, the first portions 44 and 76 (FIG. 6) of the first and second apertures 42, 43 form opening faces 62 (see FIGS. 7 and 8) in plane P to the adapter mounting openings 30. The second portions 46 and 78 (FIG. 6) of the first and second apertures 42, 43 form angled side openings 64 (see FIGS. 8 and 10) of the adapter mounting openings 30.

Referring to FIGS. 8 and 10, the angled side openings 64 are formed in each of the first and second side portions 34, 36 of the bulkhead adapter plate 10. The angled side openings 64 are defined by first and second perpendicular edges 80, 82. Each of edges 80, 82 extends at non-perpendicular angle A1, A2 (FIG. 8) relative to plane P. The angled side openings 64 of the mounting openings 30 receive the adapters 32 in an angled orientation (see e.g., FIG. 12) relative to the center portion 38 (i.e., plane P) of the adapter frame 22.

In the illustrated embodiment, an array of twelve angled adapter mounting openings 30 including two rows of six aligned openings is formed. As can be understood, other numbers of openings can be formed in accordance with the principles disclosed.

Referring again to FIG. 6, the angled mounting openings 30 of the bulkhead adapter plate 10 are provided in part by the location of the apertures 42, 43 in the flat sheet of metal 40. In particular, the apertures 42, 43 are located such that the bend lines B2 and B3 intersect the apertures 42, 43. The intersection of the apertures 42, 43 define the first aperture portions 44, 76 that are formed in the center portion 38 and the second aperture portion 46, 78 that are formed in the side portions 34, 36.

Referring still to FIG. 6, each of the first and second side portions 34, 36 has notched cutouts 66 formed in an edge 68 opposite the respective bend line B2, B3. As will be described in greater detail hereinafter, the notched cutouts permit a technician to install or insert the adapters into the mounting openings 30 from either a front side 74 (FIG. 3) of the bulkhead adapter plate 10 or a rear side 75 (FIG. 4) of the bulkhead adapter plate.

Figure 12:
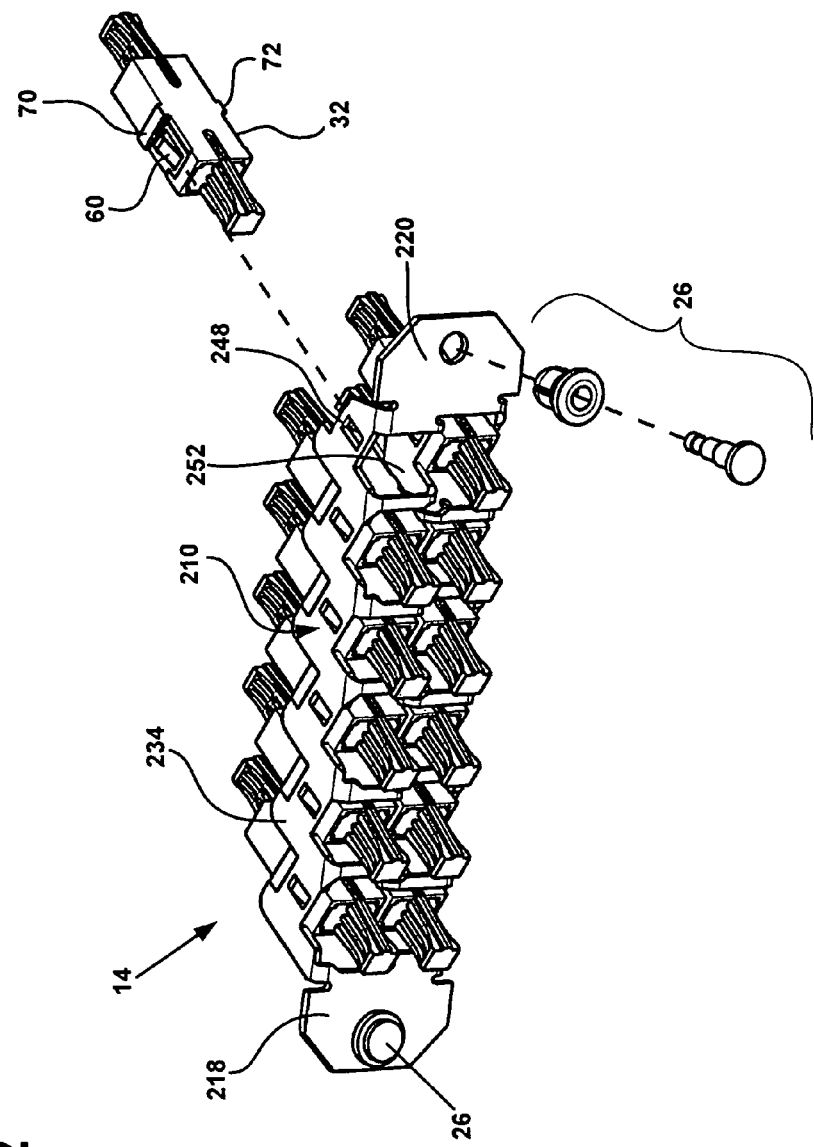
FIG. 12 is front perspective view of the second embodiment of the bulkhead adapter plate formed from the sheet form of FIG. 11 in accordance with the principles disclosed, and further showing adapters mounted to the bulkhead adapter plate.

To assemble the bulkhead adapter assembly 14, the adapters 32 (see e.g., FIG. 12) are oriented at an angle relative to the plane P (FIG. 8) defined by the center portion 38 of the bulkhead adapter plate 10. The adapters 32 are then inserted within the mounting openings 30. Referring to FIGS. 3 and 12, when inserted from the front side 74 of the bulkhead adapter plate 10, a first locating shoulder 70 of the adapter 32 contacts the first edge 80 of the mounting opening 30. Likewise, a second locating shoulder 72 of the adapter contacts an edge 84 of the center tab 52. The contact between the locating shoulders 70, 72 and the edges limits the axial insertion of the adapters 32.

To secure the adapters in the mounting openings 30, mounting tabs 60 (e.g., FIG. 12) located on opposite sides of the adapters 32 engage the through holes 48 (FIG. 3) of the bulkhead adapter plate 10. In particular, one mounting tab 60 of a single adapter 32 engages one of the through hole 48 in one of the side portions 34, 36, and the other mounting tab 60 engages the through hole 48 in one of the center tabs 52.

Referring now to FIGS. 4 and 12, when the adapters 32 are inserted from the rear side 75 of the bulkhead adapter plate 10, the first locating shoulder 70 of the adapter 32 contacts an edge 86 of the cutout 66 (see also FIG. 8) of the respective side portion (e.g., 36). Likewise, the second locating shoulder 72 of the adapter contacts a bottom edge 88 (see also FIG. 6) of the center tab 52. Similar to the previous assembly method, to secure the adapters in the mounting openings 30, the mounting tabs 60 (e.g., FIG. 12) located on the opposite sides of the adapters 32 engage the through holes 48 (FIG. 4) of the bulkhead adapter plate 10.

Referring now to FIG. 11, another sheet of metal 240 used in the manufacture of a second embodiment of a bulkhead adapter plate 210 (FIG. 12) is illustrated. Similar to the previous embodiment, the resulting bulkhead adapter plate 210 includes first and second flange ends 218, 220 and an adapter frame 222 located between the ends. The adapter frame 222 includes a first side portion 234, a second side portion 236, and a center portion 238 located between the side portions. The center portion 238 of the flat sheet of metal 240 includes a first row 250 of center tabs 252 and a second row 254 of center tabs 252. Each of the center tabs 252 is interconnected to a cross piece 258 of the center portion 238. Unlike the first embodiment, the cross pieces 258 to which the center tabs 252 are integrally attached are connected to only one of the side portions 234, 236, rather than to both side portions. This embodiment permits the bulkhead adapter plate 210 to have a shortened overall length in comparison to the first embodiment; for use in applications requiring the particular shortened length.

Referring now to FIGS. 13 and 14, a third embodiment of a bulkhead adapter plate 310 according to the principles of the present disclosure is illustrated. The bulkhead adapter plate 310 generally includes a first flange end 318, a second flange end 320, and an adapter frame 322. The adapter frame 322 extends between the first and second flange ends 318 and 320. A mounting hole 324 is formed in each of the first and second flange ends 318, 320. The mounting holes 324 are sized to receive fasteners 26 (FIG. 5) that mount the bulkhead adapter plate 310 to a cable management drawer (e.g., 12 in FIG. 5).

The bulkhead adapter plate 310 defines a plurality of integral adapter mounting openings 330. The adapter mounting openings 330 are sized to receive adapters such as SC type adapter or LC type adapters. In this embodiment, the openings receive adapters each having two connection locations; the openings can be sized to receive other types of adapters as well. The adapters and the adapter plate 310 define a bulkhead adapter assembly (see for example, 14 in FIG. 5) that mounts in the front panel (e.g., 16) of a cable management drawer.

Referring still to FIGS. 13 and 14, the adapter frame 322 of the bulkhead adapter plate 310 includes a first side portion 334, a second side portion 336, and a center portion 338 located between the first and second side portions. The center portion 338 of the adapter frame 322 is integrally connected to the first and second flange ends 318, 320 of the bulkhead adapter plate 310.

Referring now to FIG. 15, the bulkhead adapter plate 310 originates as a flat sheet of metal 340. The flat sheet of metal 340 includes each of the first and second flange ends 318, 320, the first and second side portion 334, 336 of the adapter frame 322, and the center portion 338 of the adapter frame 322.

The flat sheet of metal 340 further defines apertures 342. In the illustrated embodiment, six apertures 342 are provided. Each of the apertures 342 has a first aperture portion 344 that is formed within the center portion 338 of the adapter frame 322, a second aperture portion 346 that extends into or is formed within the side portion 334 of the adapter frame, and a third aperture portion 347 that extends into or is formed within the side portion 336 of the adapter frame. Cross pieces 358 of the center portion 338 generally define first aperture portions 344 of the apertures 342. The cross pieces 358 extend between and are interconnected to each of the first and second side portions 334, 336 of the adapter frame 322. The cross pieces 358 of the adapter frame 322 define a plane P (FIG. 17, see also FIG. 13). Through holes 348 are provided in each of the side portions 334, 336 of the adapter frame 322.

To manufacture the bulkhead adapter plate 310 of FIG. 13, the flat sheet of metal 340 (FIG. 15) undergoes two bending procedures. In particular, one of the first and second side portions (e.g., 334) of the flat sheet of metal 340 is bent generally perpendicular to plane P at a bend line (e.g., B1). The other of the first and second side portions (e.g., 336) is then bent generally perpendicular to plane P at a bend line (e.g., B2). Each of the bending operations includes bending the portions 334, 336 at bend lines B1-B2 that extend along a major dimension (i.e., the length L, FIG. 15) of the adapter frame 322. Only two bending operations are required to produce the bulkhead adapter plate of FIGS. 13 and 14, as opposed to the thirteen bending operations required to produce the prior art plate 2 of FIG. 1. As previously discussed, this reduces the costs of manufacturing and improves the flatness characteristics of the adapter plate.

Referring to FIGS. 16-18, upon completion of the two bending operations, the first and second side portions 334, 336 are generally parallel to one another. The apertures 342 of the flat sheet of metal 340 (FIG. 15) form the adapter mounting openings 330 of the bulkhead adapter plate 310. In particular, the first portions 344 (FIG. 16, see also FIG. 15) of the apertures 342 form opening faces 362 (see FIGS. 16 and 17) in plane P to the adapter mounting openings 330. The second and third portions 346 and 347 of the apertures 342 form angled side openings 364 (see FIGS. 14 and 17) of the adapter mounting openings 330.

Referring to FIGS. 14 and 17, the angled side openings 364 are formed in each of the first and second side portions 334, 336 of the bulkhead adapter plate 310. The angled side openings 364 are defined by first and second perpendicular edges 380, 382. Each of edges 380, 382 extends at non-perpendicular angle A1, A2 (FIG. 17) relative to plane P. The angled side openings 364 of the mounting openings 330 receive the adapters in an angled orientation relative to the center portion 338 (i.e., plane P) of the adapter frame 322. In the illustrated embodiment of FIGS. 13-18, an array of six angled adapter mounting openings 330 is formed. As can be understood, other numbers of openings can be formed in accordance with the principles disclosed.

Referring again to FIG. 15, the angled mounting openings 330 of the bulkhead adapter plate 310 are provided in part by the location of the apertures 342 in the flat sheet of metal 340. In particular, the apertures 342 are located such that the bend lines B1 and B2 intersect the apertures 342. The intersection of the apertures 342 define the first aperture portions 344 that are formed in the center portion 338 and the second and third aperture portion 346, 347 that are formed in the side portions 334, 336.

Referring still to FIG. 15, each of the first and second side portion 334, 336 has notched cutouts 366 formed in an edge 368 opposite the respective bend line B1, B2. The notched cutouts permit a technician to install or insert adapters into the mounting openings 330 from either a front side 374 (FIG. 13) of the bulkhead adapter plate 310 or a rear side 375 (FIG. 14) of the bulkhead adapter plate.

To assemble a bulkhead adapter assembly, adapters are inserted within the mounting openings 330. Referring to FIG. 13, when inserted from the front side 374 of the bulkhead adapter plate 310, a first locating shoulder of the adapter contacts the first edge 380 of the opening side 346 in the first side portion 334. Likewise, a second locating shoulder of the adapter contacts the first edge 380 of the opening side 346 in the second side portion 336. The contact between the locating shoulders and the edges 380 limits the axial insertion of the adapters.

To secure the adapters in the mounting openings 330, mounting tabs located on opposite sides of the adapters engage the through holes 348 (FIG. 13) of the bulkhead adapter plate 310. In particular, one mounting tab of a single adapter engages one of the through hole 348 in the first side portion 334, and the other mounting tab engages the corresponding through hole 348 in the second side portion 336.

Referring now to FIG. 14, when the adapters are inserted from the rear side 375 of the bulkhead adapter plate 310, the first locating shoulder of the adapter contacts each edge 386 of two corresponding cutouts 366 (see also FIG. 15) of the side portions 334, 336. Similar to the previous assembly method, to secure the adapters in the mounting openings 330, the mounting tabs of the adapters engage the through holes 348 (FIG. 14) of the bulkhead adapter plate 310.

Referring now to FIG. 19, another sheet of metal 440 used in the manufacture of a fourth embodiment of a bulkhead adapter plate (similar to bulkhead adapter plate 310 in FIG. 13) is illustrated. Like to the previous embodiment, the sheet of metal 440, and resulting bulkhead adapter plate, include first and second flange ends 418, 420 and an adapter frame 422 located between the ends. The adapter frame 422 includes a first side portion 434, a second side portion 436, and a center portion 438 located between the side portions. The center portion 438 of the flat sheet of metal 440 includes cross pieces 458 that generally define the first portion first aperture portions 444 of apertures 442. In this embodiment, the cross pieces 458 are narrower provide a shortened overall length in comparison to the previous embodiment; for use in applications requiring the particular shortened length.

Referring now to FIGS. 20 and 21, a fifth embodiment a bulkhead adapter plate 510 according to the principles of the present disclosure is illustrated. The bulkhead adapter plate 510 includes a first flange end 518, a second flange end 520, and an adapter frame 522. The adapter frame 522 extends between the first and second flange ends 518 and 520. A mounting hole 524 is formed in each of the first and second flange ends 518, 520. The mounting holes 524 are sized to receive fasteners 26 (FIG. 5) that mount the bulkhead adapter plate 510 to a cable management drawer (e.g., 12 in FIG. 5).

The bulkhead adapter plate 510 defines first and second integral adapter mounting openings 530, 531. The adapter mounting openings 530, 531 each sized to receive an aligned number of adapters, such as SC type adapter or LC type adapters. The adapters and the adapter plate 510 define the bulkhead adapter assembly (see for example, 14 in FIG. 5) that mounts in the front panel (e.g., 16) of the cable management drawer.

Referring still to FIGS. 20 and 21, the adapter frame 522 of the bulkhead adapter plate 510 includes a first side portion 534, a second side portion 536, and a center portion 538 located between the first and second side portions. Each of the first and second side portions 534, 536, and the center portion 538 of the adapter frame 522 is integrally connected to the first and second flange ends 518, 520 of the bulkhead adapter plate 510.

Referring now to FIG. 22, the bulkhead adapter plate 510 originates as a flat sheet of metal 540. The flat sheet of metal 540 includes each of the first and second flange ends 518, 520, the first and second side portion 534, 536 of the adapter frame 522, and the center portion 538 of the adapter frame 522. Each of the first and second side portions 534, 536 and the center portion 538 of the adapter frame 522 has front cutouts 565 and rear cutouts 566. Through holes 548 are provided in each of the side portions 534, 536 and the center portion 538 of the adapter frame 522.

Figure 23:
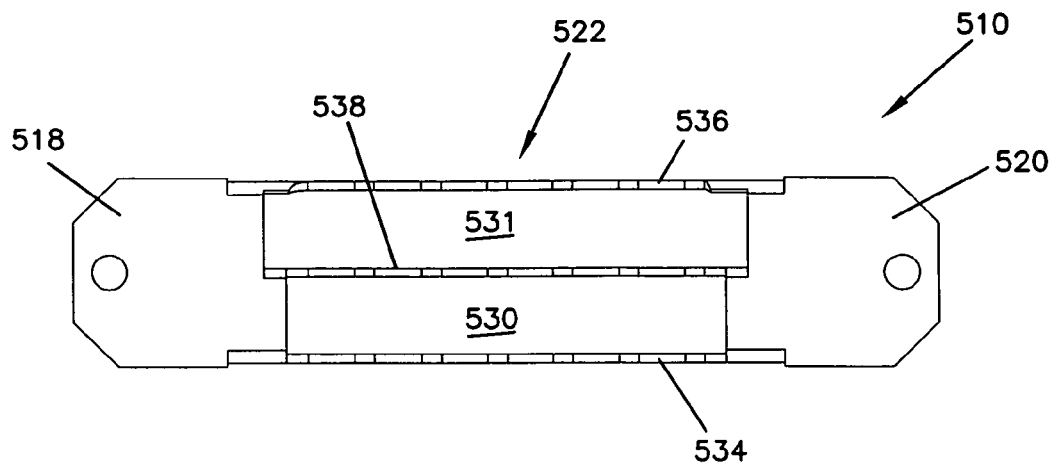
FIG. 23 is a bottom view of the bulkhead adapter plate of FIG. 20 formed upon completion of the bending process of the sheet form of FIG. 22.
Figure 24:
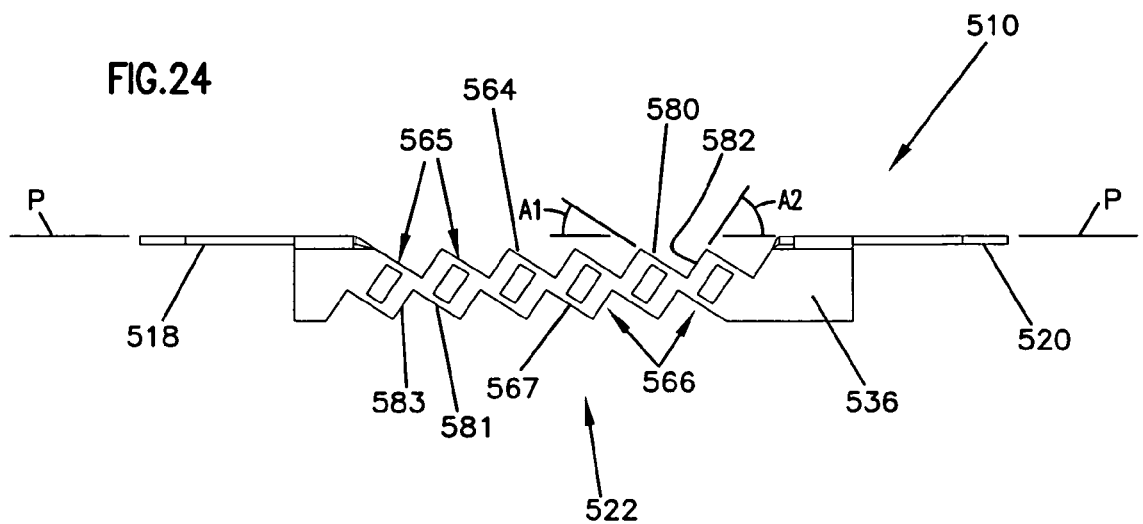
FIG. 24 is a side elevation view of the bulkhead adapter plate of FIG. 20 formed upon completion of the bending process of the sheet form of FIG. 22.

Referring now to FIGS. 21 and 24, the adapter frame 522 has a front 574 that generally defines a plane P (FIG. 24). To manufacture the bulkhead adapter plate 510, the flat sheet of metal 540 (FIG. 22) undergoes three bending procedures. In particular, the center portion 538 is first bent generally perpendicular to plane P (FIG. 24) at a bend line B1. One of the first and second side portion (e.g., 536) is then bent generally perpendicular to the plane P at a bend line (e.g., B2). Last, the other of the first and second side portions (e.g., 534) is bent generally perpendicular to plane P at a bend line (e.g., B3). Each of the bending operations includes bending the portions 534, 536, 538 at bend lines B1-B3 that extend along a major dimension (i.e., the length L, FIG. 22) of the adapter frame 522. Only three bending operations are required to produce the bulkhead adapter plate of FIGS. 20 and 21, as opposed to the thirteen bending operations required to produce the prior art plate 2 of FIG. 1. Referring to FIG. 23, upon completion of the three bending operations, the first and second side portions 534, 536, and the center portion 538 of the adapter frame 522 are generally parallel to one another.

Referring to FIG. 24, the front cutouts 565 of the flat sheet of metal 540 (FIG. 22) form angled side openings 564 of the adapter mounting openings 530, 531. The angled side openings 564 are defined by first and second perpendicular edges 580, 582. Each of edges 580, 582 extends at non-perpendicular angle A1, A2 (FIG. 24) relative to plane P. The angled side openings 564 of the mounting openings 530 receive the adapters in an angled orientation relative to the plane P of the adapter frame 522. Likewise, the rear cutouts 566 of the flat sheet of metal 540 (FIG. 22) form angled side openings 567 (FIG. 24). The angled side openings 567 are defined by first and second perpendicular edges 581, 583. Each of edges 581, 583 extends at non-perpendicular angle relative to plane P.

In the illustrated embodiment, an array of twelve angled adapters can be mounted within the two mounting openings 530, 531, the array including two rows of six aligned and angled adapters. As can be understood, other numbers of adapters or array configurations can be formed in accordance with the principles disclosed.

To assemble a bulkhead adapter assembly, adapters inserted within the mounting openings 530, 531. Referring to FIG. 21, when inserted from the front side 574 of the bulkhead adapter plate 510, a first locating shoulder of the adapter contacts the first edge 580 of the one of the side portions (e.g., 534). Likewise, a second locating shoulder of the adapter contacts the first edge 580 of the center portion 538. The contact between the locating shoulders and the edges limits the axial insertion of the adapters.

To secure the adapters in the mounting openings 530, 531, mounting tabs located on opposite sides of the adapters engage the through holes 548 (FIG. 21) of the bulkhead adapter plate 510. In particular, one mounting tab of a single adapter engages one of the through hole 548 in one of the side portions (e.g., 534), and the other mounting tab engages the through hole 548 in the center portion 538.

Referring now to FIG. 20, when the adapters are inserted from a rear side 575 of the bulkhead adapter plate 510, the first locating shoulder of the adapter contacts the edge 581 of the rear cutout 566 (see also FIG. 22) of one of the side portions (e.g., 536). Likewise, the second locating shoulder of the adapter contacts the edge 581 of the rear cutout 566 of the center portion 538. Similar to the previous assembly method, to secure the adapters in the angled orientation, the mounting tabs located on the opposite sides of the adapters engage the through holes 548 (FIG. 20) of the bulkhead adapter plate 510.

Figure 25:
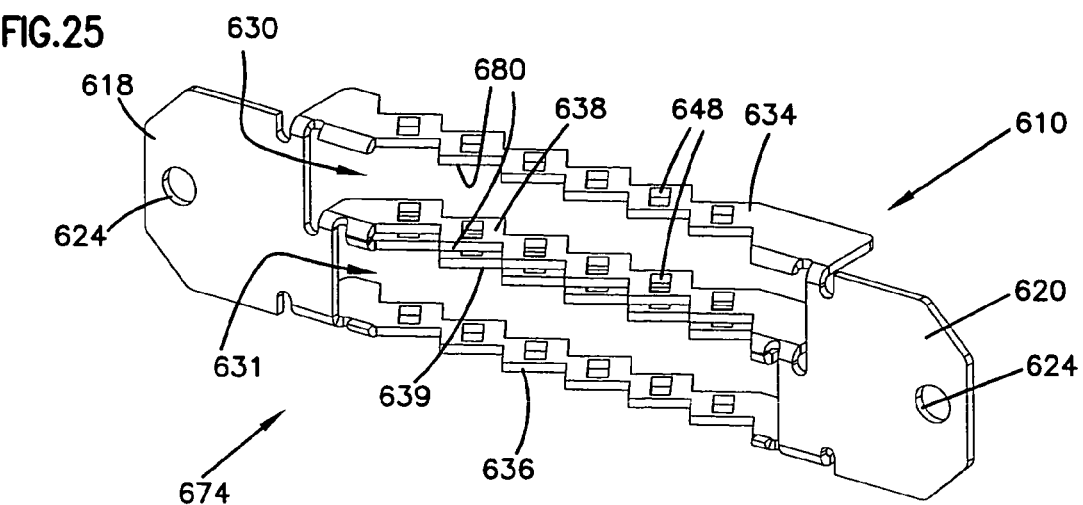
FIG. 25 is a front perspective view of sixth embodiment of a bulkhead adapter plate according to the principles of the present disclosure.
Figure 26:
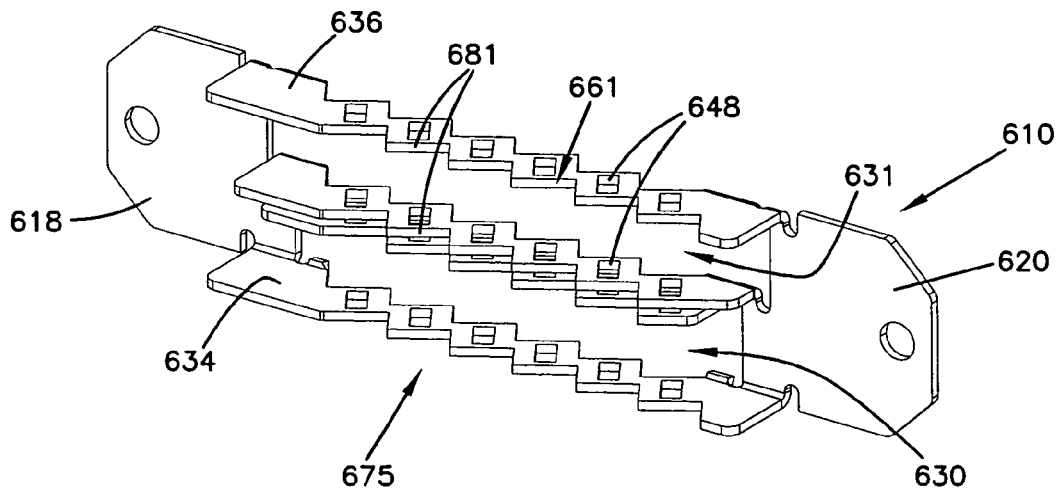
FIG. 26 is a rear perspective view of the bulkhead adapter plate of FIG. 25.

Referring now to FIGS. 25 and 26, a sixth embodiment a bulkhead adapter plate 610 according to the principles of the present disclosure is illustrated. The bulkhead adapter plate 610 includes a first flange end 618, a second flange end 620, and an adapter frame 622. The adapter frame 622 extends between the first and second flange ends 618 and 620. A mounting hole 624 is formed in each of the first and second flange ends 618, 620. The mounting holes 624 are sized to receive fasteners 26 (FIG. 5) that mount the bulkhead adapter plate 610 to a cable management drawer (e.g., 12 in FIG. 5).

The bulkhead adapter plate 610 defines first and second integral adapter mounting openings 630, 631. The adapter mounting openings 630, 631 each sized to receive an aligned number of adapters, such as SC type adapter or LC type adapters. The adapters and the adapter plate 610 define the bulkhead adapter assembly (see for example, 14 in FIG. 5) that mounts in the front panel (e.g., 16) of the cable management drawer.

Referring still to FIGS. 25 and 26, the adapter frame 622 of the bulkhead adapter plate 610 includes a first side portion 634, a second side portion 636, a first center portion 638, and a second center portion 639. Each of the side portions 634, 636, and the center portions 638, 639 of the adapter frame 622 is integrally connected to the first and second flange ends 618, 620 of the bulkhead adapter plate 610.

Figure 27:
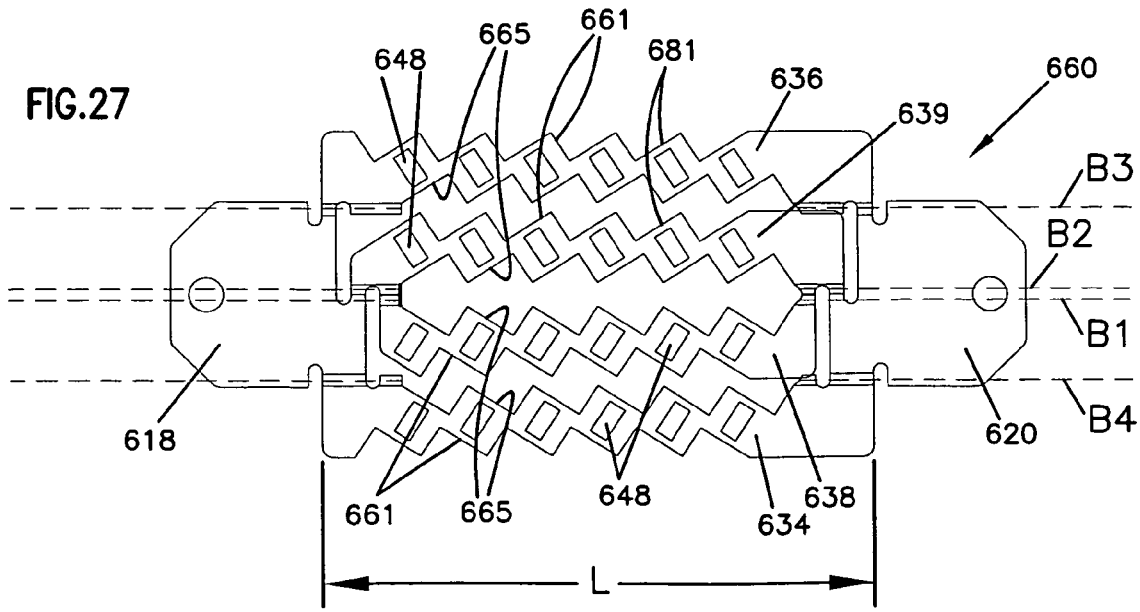
FIG. 27 is a top plan view of a sheet form of the bulkhead adapter plate of FIG. 25, illustrated prior to a bending process.

Referring now to FIG. 27, the bulkhead adapter plate 610 originates as a flat sheet of metal 640. Similar to the previous embodiment, each of the side portions 634, 636 and the center portions 638, 639 of the adapter frame 622 has front cutouts 665 and rear cutouts 661. Through holes 648 are provided in each of the side portions 634, 636 and the center portions 638, 639 of the adapter frame 622.

Referring now to FIGS. 25 and 29, the adapter frame 622 has a front 674 that generally defines a plane P (FIG. 29). To manufacture the bulkhead adapter plate 610 of FIG. 25, the flat sheet of metal 640 (FIG. 27) undergoes four bending procedures. In particular, one of the first and second center portions (e.g., 638) is first bent generally perpendicular to plane P (FIG. 29) at a bend line B1. The other of the first and second center portions (e.g., 639) is then bent generally perpendicular to plane P at a bend line (e.g., B2). Next, one of the first and second side portion (e.g., 636) is bent generally perpendicular to the plane P at a bend line (e.g., B3). Last, the other of the first and second side portions (e.g., 634) is bent generally perpendicular to plane P at a bend line (e.g., B4). Each of the bending operations includes bending the portions 634, 636, 638, and 639 at bend lines B1-B4 that extend along a major dimension (i.e., the length L, FIG. 27) of the adapter frame 622. Only four bending operations are required to produce the bulkhead adapter plate of FIGS. 25 and 26. Referring to FIG. 28, upon completion of the four bending operations, the first and second side portions 634, 636 and the first and second center portions 638, 639 of the adapter frame 622 are generally parallel to one another.

Referring to FIG. 29, the front cutouts 665 of the flat sheet of metal 640 (FIG. 27) form angled side openings 664 of the adapter mounting openings 630, 631. The angled side openings 664 are defined by first and second perpendicular edges 680, 682. Each of edges 680, 682 extends at non-perpendicular angle A1, A2 (FIG. 29) relative to plane P. The angled side openings 664 of the mounting openings 630 receive the adapters in an angled orientation relative to the plane P of the adapter frame 622. Likewise, the rear cutouts 661 of the flat sheet of metal 640 (FIG. 27) form angled side openings 667 (FIG. 29). The angled side openings 667 are defined by first and second perpendicular edges 681, 683. Each of edges 681, 683 extends at non-perpendicular angle relative to plane P.

In the illustrated embodiment, an array of twelve angled adapters can be mounted within the two mounting openings 630, 631, the array including two rows of six aligned and angled adapters. As can be understood, other numbers of adapters or array configurations can be formed in accordance with the principles disclosed.

To assemble a bulkhead adapter assembly, adapters inserted within the mounting openings 630, 631. Referring to FIG. 25, when inserted from the front side 674 of the bulkhead adapter plate 610, a first locating shoulder of the adapter contacts the first edge 680 of the one of the side portions (e.g., 634). Likewise, a second locating shoulder of the adapter contacts the first edge 680 of a corresponding one of the center portions (e.g., 638). The contact between the locating shoulders and the edges limits the axial insertion of the adapters.

To secure the adapters in the mounting openings 630, 631, mounting tabs located on opposite sides of the adapters engage the through holes 648 (FIG. 25) of the bulkhead adapter plate 610. In particular, one mounting tab of a single adapter engages one of the through hole 648 in one of the side portions (e.g., 634), and the other mounting tab engages the through hole 648 in the corresponding one of the center portions (e.g., 638).

Referring now to FIG. 26, when the adapters are inserted from a rear side 675 of the bulkhead adapter plate 610, the first locating shoulder of the adapter contacts the edge 681 of the rear cutout 661 (see also FIG. 27) of one of the side portions (e.g., 636). Likewise, the second locating shoulder of the adapter contacts the edge 681 of the rear cutout 661 of the corresponding one of the center portions (e.g., 639). Similar to the previous assembly method, to secure the adapters in the angled orientation, the mounting tabs located on the opposite sides of the adapters engage the through holes 648 (FIG. 26) of the bulkhead adapter plate 610.

Referring now to FIG. 30, a schematic representation of a tool 700 is illustrated. The tool 700 can be used to remove an adapter from the mounting openings of the various bulkhead adapter panels presently disclosed. The tool 700 generally includes a body 710 having thin arms 720. To remove an adapter, the thin arms 720 are inserted between adapter 32 and the portions of the adapter frame (e.g., side portion 234 and center tab 252 in FIG. 12) that are retaining the adapter. As the thin arms 720 are inserted, the arms contact the flexible mounting tabs 60. The contact causes the flexible mounting tabs 60 to flex toward one another and disengage from the through holes 248. The adapter 32 can then be removed from the mounting opening.

The above specification provides a complete description of the present invention. Since many embodiments of the invention can be made without departing from the spirit and scope of the invention, certain aspects of the invention reside in the claims hereinafter appended.

What is claimed is:

1. A method of manufacturing a bulkhead adapter plate, the method comprising the steps of:
   a) providing a flat sheet of metal, the flat sheet of metal including first and second flange ends and an adapter frame located between the flange ends, the adapter frame including a first side portion, a second side portion, and a center portion located between the first and second side portions, the flat sheet of metal defining apertures that extend into both the center portion and at least one of the first and second side portions of the adapter frame;
   b) bending the first side portion of the adapter frame perpendicular to the center portion;
   c) bending the second side portion of the adapter frame perpendicular to the center portion;
   d) wherein the apertures form adapter mounting openings when the first and second side portions are bent, the adapter mounting openings being constructed to position adapters in an angled orientation relative to the center portion of the adapter frame.

2. The method of claim 1, wherein the step of bending the first and second side portions includes bending each side portion at a fold line, the fold line intersecting one or more of the apertures.

3. The method of claim 1, further including forming holes in each of the side portions, the holes being sized for receiving adapter mounting tabs.

4. The method of claim 1, wherein the adapter frame of the flat sheet of metal includes a number of tabs interconnected to the center portion, the method further including bending each of the tabs perpendicular to the center portion.

5. The method of claim 4, wherein the number of tabs includes first and second rows of tabs, the step of bending each of the tabs including bending the first row of tabs in a first direction perpendicular to the center portion and bending the second row of tabs in a second opposite direction perpendicular to the center portion, the bent tabs forming a single row of tabs depending from the center portion.

6. The method of claim 5, wherein twelve individual adapter mounting openings are formed by only the four bending steps.

7. The method of claim 1, wherein six individual adapter mounting openings are formed by only the two bending steps.

8. The method of claim 1, wherein the steps of bending the portions of the adapter frame including bending the portions at bend lines that extend along a major length of the adapter frame.

* * * * *